United States Patent
Tsai et al.

(10) Patent No.: US 6,907,602 B2
(45) Date of Patent: Jun. 14, 2005

(54) METHOD FOR UPDATING FIRMWARE OF COMPUTER DEVICE

(75) Inventors: Michael Tsai, Hsinchu (TW); Roger Huang, Hsinchu (TW)

(73) Assignee: Mustek Systems Inc. (TW)

(*) Notice: Subject to any disclaimer, the term of this patent is extended or adjusted under 35 U.S.C. 154(b) by 11 days.

(21) Appl. No.: 10/657,114

(22) Filed: Sep. 9, 2003

(65) Prior Publication Data

US 2004/0068334 A1 Apr. 8, 2004

Related U.S. Application Data

(63) Continuation of application No. 09/635,221, filed on Aug. 10, 2000, now abandoned.

(51) Int. Cl.[7] .................................................. G06F 9/44
(52) U.S. Cl. ...................................................... 717/168
(58) Field of Search ................................. 717/168–173; 714/15, 38, 41; 369/30.11; 725/25; 711/162; 713/2

(56) References Cited

U.S. PATENT DOCUMENTS

| 5,717,887 | A | | 2/1998 | Leslie |
| 5,878,256 | A | | 3/1999 | Bealkowski et al. |
| 5,901,320 | A | | 5/1999 | Takahashi et al. |
| 6,205,526 | B1 | | 3/2001 | Tanuma |
| 6,357,021 | B1 | * | 3/2002 | Kitagawa et al. ............. 714/41 |
| 6,360,362 | B1 | * | 3/2002 | Fichtner et al. ............. 717/168 |
| 6,467,087 | B1 | | 10/2002 | Yang |
| 6,536,038 | B1 | * | 3/2003 | Ewertz et al. ............... 717/168 |
| 6,665,813 | B1 | * | 12/2003 | Forsman et al. ............. 714/15 |

\* cited by examiner

*Primary Examiner*—Todd Ingberg
*Assistant Examiner*—Tuan A Vu
(74) *Attorney, Agent, or Firm*—Lowe Hauptman & Berner, LLP

(57) ABSTRACT

A method for updating firmware includes dividing a memory of a computer device into five portions, wherein an initial program, an old program, an old backup firmware, the checksum of the old firmware, and the checksum of the old backup firmware are saved, respectively, in the first portion, the second portion, the third portion, the fourth portion and the fifth portion; executing the initial program in the first portion; writing a new firmware into the second portion from an external device for replacing the old firmware; writing the checksum of the new firmware into the fourth portion; writing the new firmware into the third portion for replacing the old backup firmware; writing the checksum of the new firmware into the fifth portion; and executing the new firmware in the second portion for operating the computer device.

1 Claim, 7 Drawing Sheets

METHOD FOR UPDATING FIRMWARE OF COMPUTER DEVICE

This application is a continuation of U.S. application Ser. No. 09/635,221 filed Aug. 10, 2000, now abandoned.

BACKGROUND OF THE INVENTION

1. Field of the Invention

The present invention generally relates to a method for updating firmware of computer device, and more particularly to a method for updating firmware of computer device to write the newer firmware into the computer memory twice.

2. Description of the Prior Art

The current firmware upgrade technology is performed by the computer special software (initial program) along with the firmware. Said software will read the upgraded firmware data directly, and transmit it to the computer device via variable interfaces. Such computer device will delete the original firmware in the computer memory first and write the new firmware data into its memory so as to finish upgrading and updating the firmware.

FIG. 1 illustrates the above procedure. The original firmware has saved in the computer memory in the step 10 first. Then, in the step 11, the original firmware will be deleted from the computer memory, and finally the new firmware from external device will be installed to the computer memory in the step 12. However, many uncertain events during the step from 10 to 12, such as the power failure, will result in the damage to the computer device.

The disadvantage of this technology is that if the power failure or other uncertain events happen upon upgrading and updating the firmware such that it causes a failure in writing the upgraded firmware, the original firmware in the memory can be destroyed or deleted, and the upgraded firmware is not completely installed in the computer memory yet. Therefore, such computer device will not function normally.

In general, the firmware, as the hybrid of the computer software and the hardware, is the hardware device with the predetermined program. In other words, the software recorded in the hardware is the firmware. For example, BIOS, recorded in the ROM on the motherboard should be implemented in order to turn on the computer before. Such BIOS, which can be modified only by the special burn-in machine, is one kind of the firmware. In addition to the ROM, the firmware can be stored in PROM, EPROM, EEPROM or other programmable ROM. The programs recorded in ROM are usually named the microprograms. In present, the content of many firmwares in EPROM can be modified by the software (initial program). For example, the microprogram in the flash BIOS of the motherboard or modem can be modified by the initial program.

SUMMARY OF THE INVENTION

In the light of the state of the art described above, it is an object of the present invention to provide a method for updating firmware of computer device which is immune to the problems of the conventional method for updating firmware of computer device. A newer firmware from external device must be written into the computer memory twice for avoiding the problem that the computer device can be not operated normally because the original firmware of the computer device has been deleted already but the newer firmware is not installed successfully into the computer memory yet.

In view of the above and other objects which will become apparent as the description proceeds, there is provided according to a general aspect of the present invention a method for updating firmware of computer device comprises dividing a memory of said computer device into five portions, wherein a initial program is saved in the first portion, a old firmware is saved in the second portion, a old backup firmware is saved in the third portion, the checksum of said old firmware is saved in the fourth portion and the checksum of said old backup firmware is saved in the fifth portion; executing said initial program in the first portion; writing a new firmware into the second portion from an external device for replacing said old firmware in the second portion; writing the checksum of said new firmware into the fourth portion from said external device; writing said new firmware into the third portion from said external device for replacing said old backup firmware in the third portion; writing the checksum of said new firmware into the fifth portion from said external device; and executing said new firmware in the second portion for operating said computer device.

Based on the idea described above, wherein said computer device includes a scanner.

Based on the aforementioned idea, wherein the step of executing said initial program further comprises verifying the correctness of said old firmware program in the second potion by checking the checksum of said old firmware in the fourth potion; verifying the correctness of said old backup firmware program in the third potion by checking the checksum of said old firmware in the fifth potion; and verifying the identity of said old firmware program and said old backup firmware program.

Based on the idea described above, wherein the step of verifying the correctness of said old firmware program further comprises writing said old backup firmware program in the third portion into the second portion for renew said old firmware program when said old firmware program is defective; and writing the checksum of said old backup firmware program in the fifth portion into the fourth portion for renew the checksum of said old firmware program.

Based on the aforementioned idea, wherein the step of verifying the correctness of said old backup firmware program further comprises writing said old firmware program in the second portion into the third portion for renew said old backup firmware program when said old backup firmware program is defective; and writing the checksum of said old firmware program in the fourth portion into the fifth portion for renew the checksum of said old-backup firmware program.

Based on the idea described above, wherein the step of verifying.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
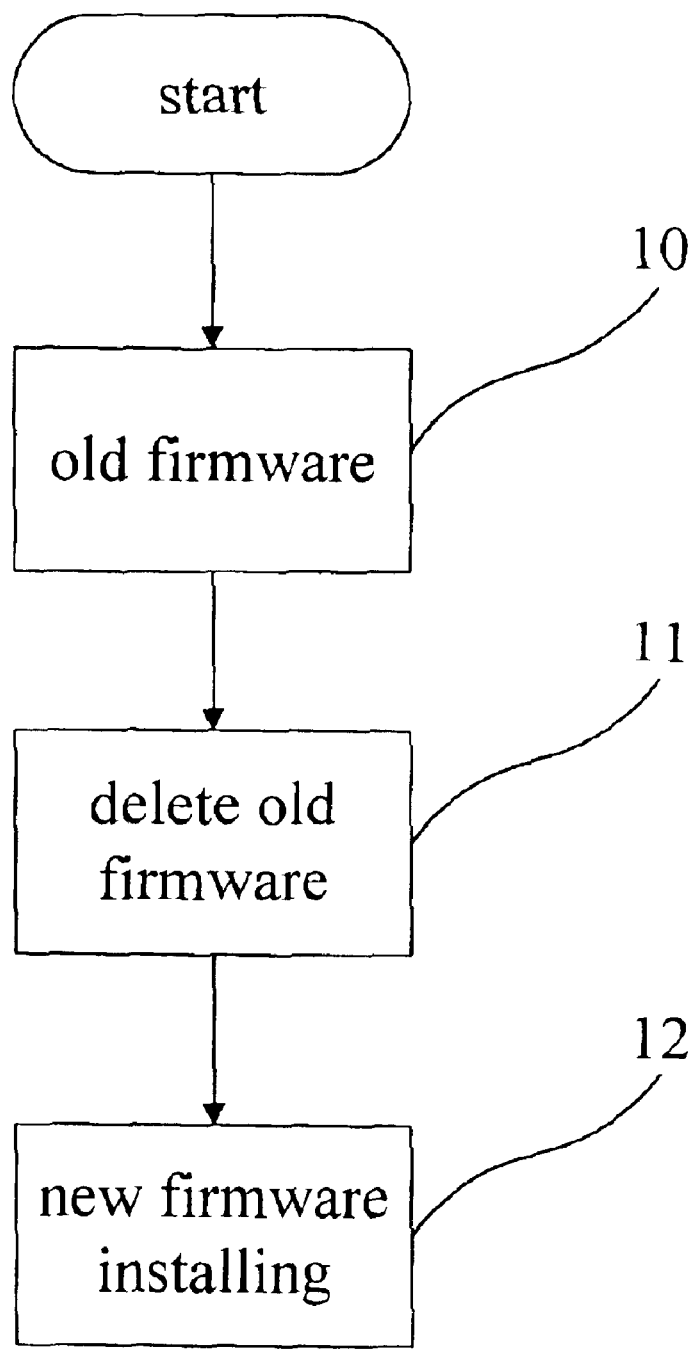
FIG. 1 illustrates the flowchart of conventional updating firmware.

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

First, in the preferred embodiment to this invention, the computer memory should be divided into five portions as illustrated in Table 1. The Initial Program is saved to the first portion. The firmware program (P1) is saved to the second portion. The backup firmware program (P2) is saved to the third portion. The parameter of the P1 is saved to the fourth portion. The parameter of the P2 is saved to the fifth portion. This invention can also be applied to the scanner.

TABLE 1

| First portion: | initial program |
|---|---|
| Second portion: | firmware program (P1) |
| Third portion: | backup firmware program (P2) |
| Fourth portion: | the parameter (checksum) of the P1 |
| Fifth portion: | the parameter (checksum) of the P2 |

As illustrated in Table 1, the initial program in the first portion is readable only. When the computer device starts, the initial program should be implemented first. Then, the firmware program (P1) in the second portion is read and the checksum of P1 is checked up. Such checksum will be verified in comparison with the parameter of the P1 in the fourth portion. If the verification passes, the firmware program (P1) is correct, and the whole procedure may continue.

If the firmware program (P1) is not correct upon the verification of the checksum of P1 and the parameter of the P1 in the fourth portion, the firmware program (P1) should be defective after the previous update. Then the initial program should read the backup firmware program (P2) in the third portion and write it into the second portion in order to repair the original firmware program (P1) and the computer device can operate normally.

The verification of the backup firmware program (P2) in the third portion should continue after the successful verification on the firmware program (P1) in the second portion. The initial program will check up the checksum of the P2, and such checksum will be verified in comparison with the parameter of the P2 in the fifth portion. If the verification passes, the backup firmware program (P2) is correct, and the next step may be proceeded. If the verification fails, the backup firmware program (P2) should be defective. Then the initial program will read the firmware program (P1) in the second portion and write it into the third portion. Thus, the backup firmware program (P2) will be correct again.

The firmware program (P1) should be compared with the backup firmware program (P2) after the successful verification on the firmware program (P1) and the backup firmware program (P2). The reason is that the update step of the backup firmware (P2) may not be run due to the power failure after the successful update on the firmware program (P1). Therefore, if the firmware program (P1) is not the same with the backup firmware program (P2), the firmware program (P1) in the second portion should be duplicated to the third portion as the backup firmware program (P2). After the result regarding the comparison between the firmware program (P1) and the backup firmware program (P2) is identical, the implementation of the initial program will cease. And the firmware program (P1) should be implemented in order to operate the computer device. This invention can be applied to the scanner, too.

As illustrated in Table 1, the firmware program (P1) in the second portion is the main firmware to control the computer device. The newer firmware should be written into this portion upon updating the old firmware in the future.

As illustrated in Table 1, the backup firmware program (P2) in the third portion is the backup program of the main firmware to control the computer device. If the firmware program (P1) in the second portion is defective, then the backup firmware program (P2) in the third portion can be used to repair the defective firmware program (P1) and the computer device can operate normally again.

For the initial program verifies the correctness of the firmware program (P1) and the backup firmware program (P2), the parameters of the P1, P2 firmwares in the fourth and fifth portions, as illustrated in Table 1, are the checksums for the verification on the firmware program (P1) and the backup firmware program (P2).

Next, FIGS. 2A–2E and FIG. 3 illustrate the flow chart of the preferred embodiment to this invention and also demonstrate the four conditions by referring to FIGS. 2B–2E as follows.

Figure 3:
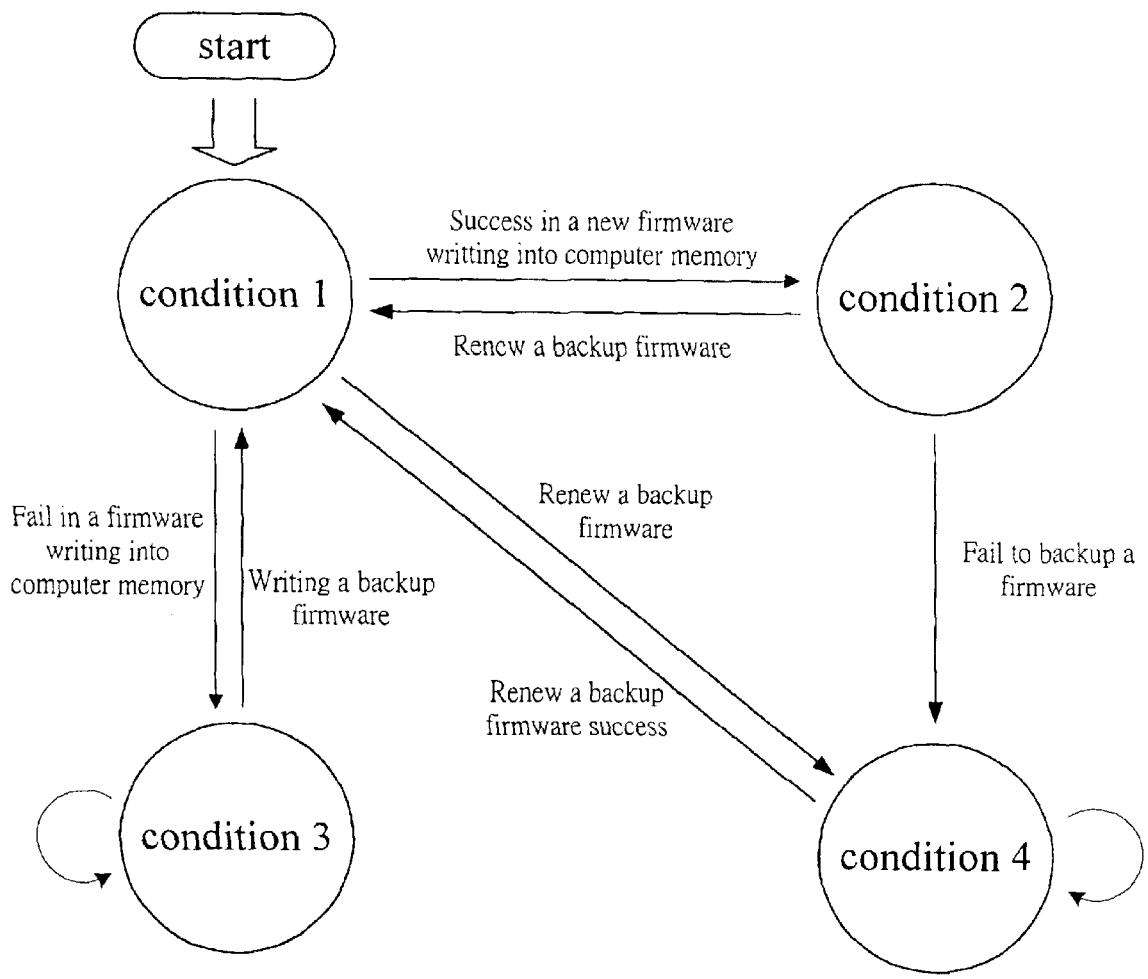
FIG. 3 illustrates the four conditions by referring to FIGS. 2B–2E.

Please see the FIG. 3. At the first condition, it is the normal condition that no firmware will be updated. The workflow of the initial program is as follows, (1) as shown in the step 21 in FIG. 2B, this is to verify the correctness of the firmware program (P1) in the second potion by checking the checksum of such firmware in the fourth potion. If such firmware is not defective, it should be correct. (2) as shown in the step 22 in FIG. 2B, it is to verify the correctness of the backup firmware program (P2) in the third potion by checking the checksum of such firmware in the fifth portion. If such firmware is not defective, it should be correct. (3) as shown in the step 23 in FIG. 2B, this is to verify the identity of the firmware program (P1) with the backup firmware program (P2). (4) as shown in the step 24 in FIG. 2B, there is no error under the above procedure, and the implementation of the firmware program (P1) in the second portion will be run to control the computer device.

Figure 2A:
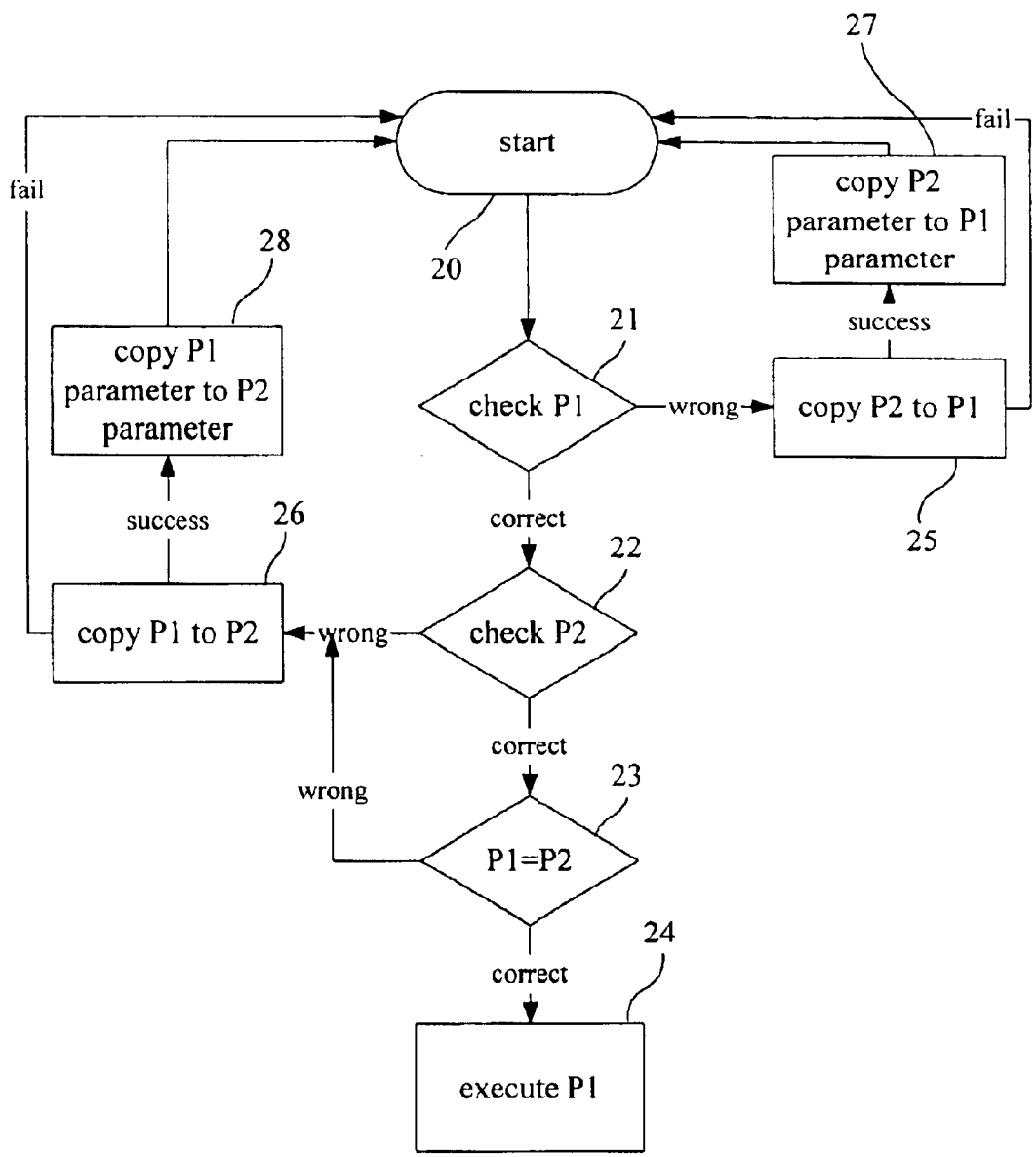
FIGS. 2A–2E illustrate the flowchart of preferred embodiment according to the present invention.
Figure 2B:
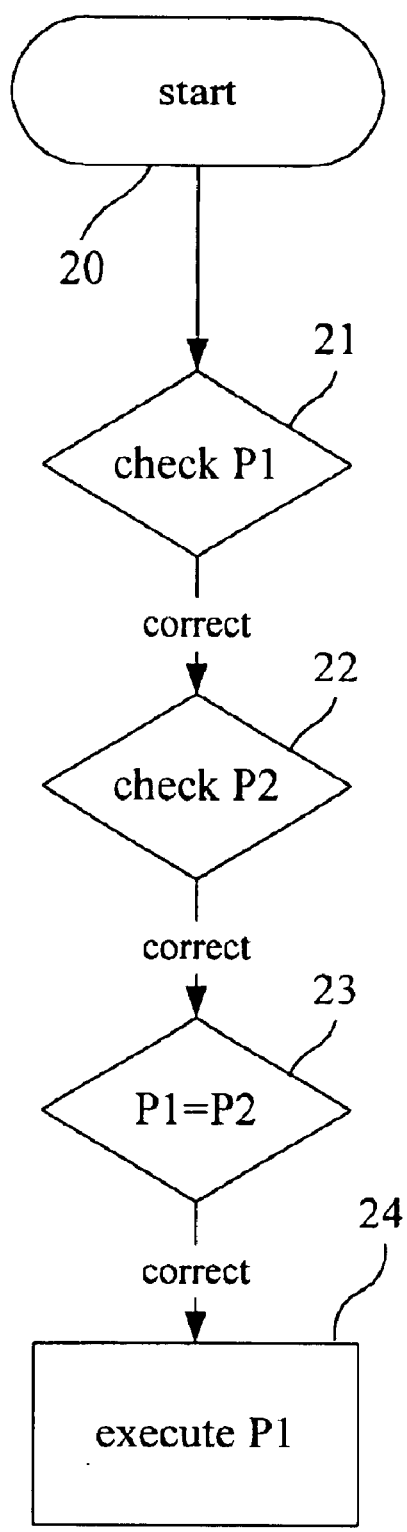
Figure 2C:
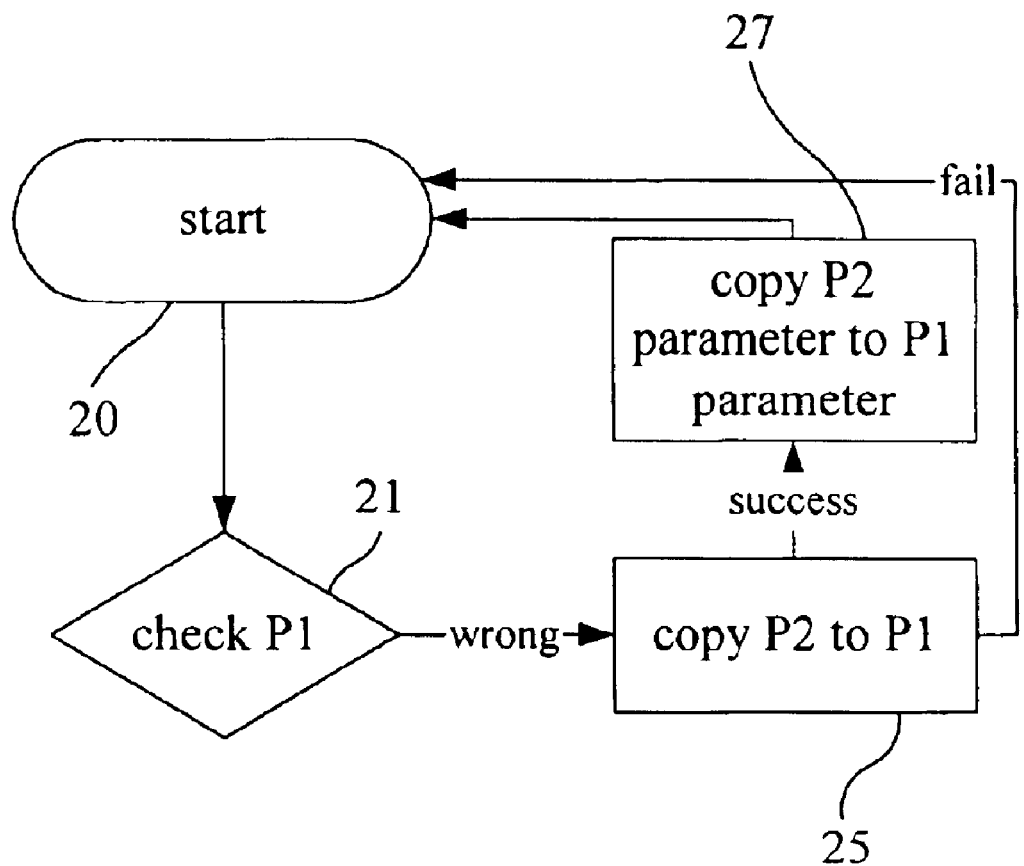

Please revisit the FIG. 3. The second condition is that the newer firmware should be written into the second portion of the computer memory but such operation fails. The workflow of the initial program is as follows, (1) as shown in the step 21 in FIG. 2C, this is to verify the correctness of the firmware program (P1) in the second portion by checking the checksum of such firmware in the fourth portion. Due to the failure of the write operation, such firmware should be defective. (2) as shown in the step 25 in FIG. 2C, the backup firmware program (P2) in the third portion will be restored into the firmware program (P1) in the second portion. If the write operation fails, the computer device should be rebooted, and the second condition may proceed. Otherwise, the next procedure as illustrated in FIG. 2C may proceed. (3) as shown in the step 27 in FIG. 2C, the parameter of the P2 in the fifth portion will be restored into the parameter of the P1 in the fourth portion. (4) as shown in FIG. 2C, there is no error under the above procedure, and the initial program will be implemented again in order to fulfill the first condition.

Figure 2D:
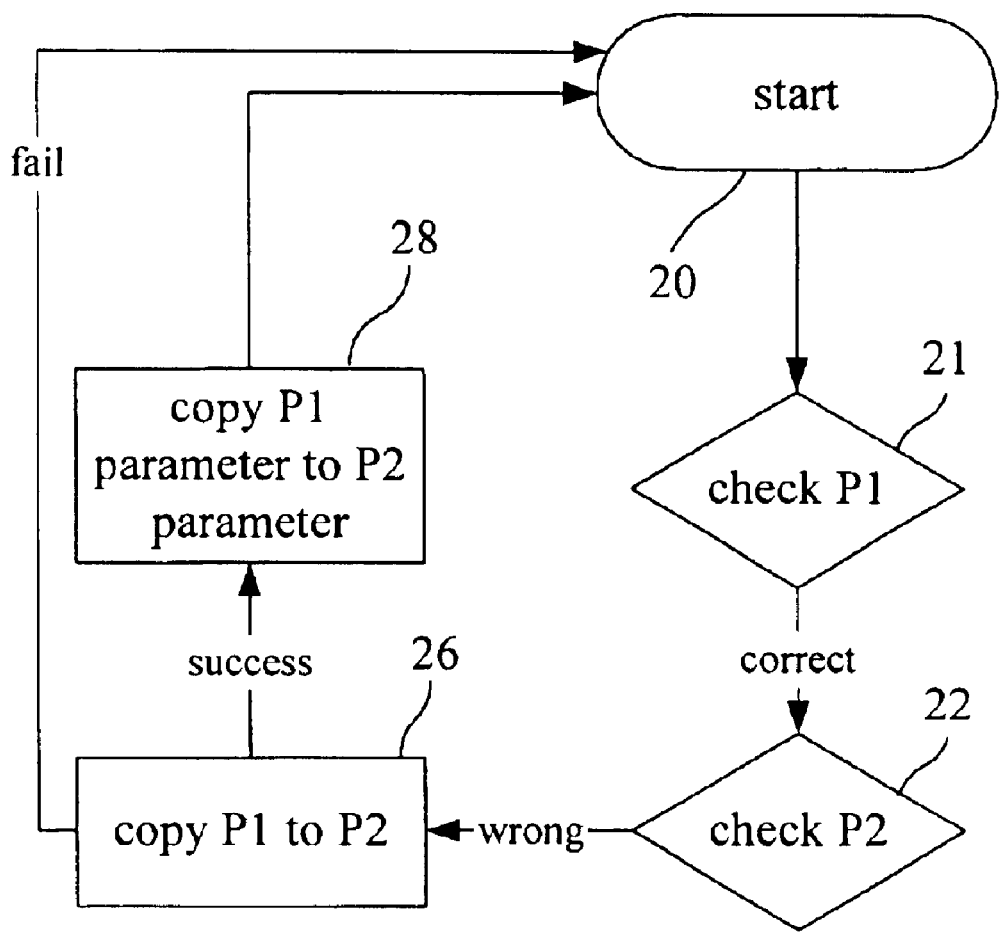

Please see FIG. 3. The third condition is that the newer firmware is successfully written into the second portion of the computer memory but it fails to write into the backup firmware program of the third portion. The workflow of the initial program is as follows, (1) as shown in the step 21 in FIG. 2D, this is to verify the correctness the firmware program (P1) in the second portion by checking the checksum of the such firmware in the fourth portion. Since the write operation finished successfully, such firmware should be correct. (2) as shown in the step 22 in FIG. 2D, this is to verify the correctness of the backup firmware program (P2)

in the third portion by checking the checksum of such firmware in the fifth portion. Due to the failure of the write operation, such firmware should be defective. (3) as shown in the step 26 in FIG. 2D, the firmware program (P1) in the second portion will be restored into the backup firmware program (P2) in the third portion. If the write operation fails, the computer device should be rebooted, and the third condition may proceed. Otherwise, the next procedure as illustrated in FIG. 2D may proceed. (4) as shown in the step 28 in FIG. 2D, the parameter of the P1 in the fourth portion will be restored into the parameter of the P2 in the fifth portion. (5) as shown in FIG. 2D, there is no error under the above procedure, and the initial program will be implemented again in order to fulfill the first condition.

Figure 2E:
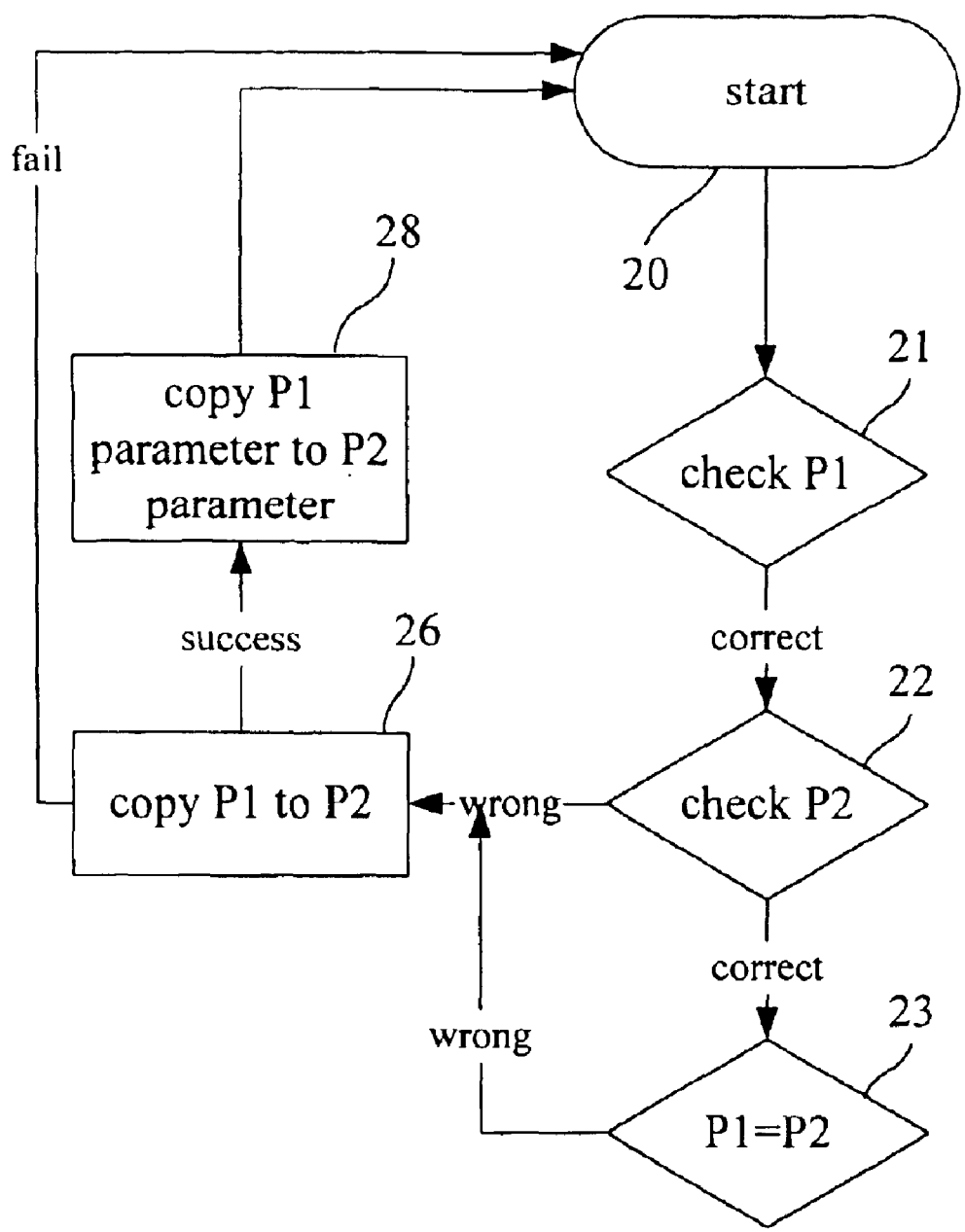

Please see FIG. 3. The fourth condition is that the newer firmware is successfully written into the second portion of the computer memory but it does not begin to write into the backup firmware program of the third portion due to the power failure or other reasons after the successful update on the firmware program (P1). The workflow of the initial program is as follows, (1) as shown in the step 21 in FIG. 2E, this is to verify the correctness the firmware program (P1) in the second portion by checking the checksum of the such firmware in the fourth portion. Since the write operation finished successfully, such firmware should be correct. (2) as shown in the step 22 in FIG. 2E, this is to verify the correctness of the backup firmware program (P2) in the third portion by checking the checksum of such firmware in the fifth portion. Due to the power failure, such firmware should be correct. (3) as shown in the step 23 in FIG. 2E, this is to verify the identity of the firmware program (P1) in the second portion with the backup firmware program (P2) in the third portion. The general method for verifying the identity of said two firmwares is to check the checksums of said two firmwares. Since the firmware program (P1) in the second portion is the newer firmware, and the backup firmware program (P2) in the third portion is the old firmware, the checksums of said two firmwares in the fourth and fifth portions are different. (4) as shown in the step 26 in FIG. 2E, the firmware program (P1) in the second portion will be restored into the backup firmware program (P2) in the third portion. If the write operation fails, the computer device should be rebooted, and the fourth condition may proceed. Otherwise, the next procedure as illustrated in FIG. 2E may proceed. (4) as shown in the step 28 in FIG. 2E, the parameter of the P1 in the fourth portion will be restored into the parameter of the P2 in the fifth portion. (5) as shown in FIG. 2E, there is no error under the above procedure, and the initial program will be implemented again in order to fulfill the first condition.

Although specific embodiments have been illustrated and described, it will be obvious to those skilled in the art that various modifications may be made without departing from what is intended to be limited solely by the appended claims.

What is claimed is:

1. A method of updating a firmware of a computer device, comprising the steps of:

dividing a memory of said computer device into a first portion, a second portion, a third portion, a fourth portion, a fifth portion, and wherein an initial program is saved in said first portion, an old firmware is saved in said second portion, an old backup firmware is saved in said third portion, a first checksum of said old firmware is saved in said fourth portion, and a second checksum of said old backup firmware is saved in said fifth portion;

executing said initial program in said first portion;

verifying correctness of said old firmware program in said second portion by checking said first checksum of said old firmware in the second portion, and having the further steps of:

writing said old backup firmware program in said third portion into said second portion for renewing said old firmware program when said old firmware program is defective, and writing said second checksum of said old backup firmware program in said fifth portion into said fourth portion for renewing said first checksum of said old firmware program;

verifying correctness of said old backup firmware program in said third portion, and having the further steps of:

writing said old firmware program in said second portion into said third portion for renewing said old backup firmware program when said old backup firmware program is defective, and writing said second checksum of said old firmware program in said fourth portion into said fifth portion for renewing said second checksum of said old backup firmware program;

verifying identity of said old firmware program and said old backup firmware program, and having the further steps of:

writing said old backup firmware program in said third portion into said second portion for renewing said old firmware program when said old backup firmware program is different from said old firmware program, and writing said second checksum of said old backup firmware program in said fifth portion into said fourth portion for renewing said first checksum of said old firmware program;

verifying correctness of said old backup firmware program in said third portion and having the further steps of:

writing a new firmware into said second portion from an external device for replacing said old firmware in said second portion;

writing a third checksum of said new firmware into said fourth portion from said external device;

writing said new firmware into said third portion from said external device for replacing said old backup firmware in the third portion;

writing said third checksum of said new firmware into said fifth from said external device; and executing said new firmware in the second portion for operating said computer device.

* * * * *